United States Patent
Hong

(10) Patent No.: US 6,724,771 B1
(45) Date of Patent: Apr. 20, 2004

(54) METHOD OF MONITORING ATM CELL BUS

(75) Inventor: Ik Pyo Hong, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/461,113

(22) Filed: Dec. 14, 1999

(30) Foreign Application Priority Data

Dec. 15, 1998 (KR) .............................................. 98-55163

(51) Int. Cl.⁷ .................................................. H04L 12/40
(52) U.S. Cl. .................. 370/438; 370/241.1; 370/395.2
(58) Field of Search ................ 370/216–227, 370/241–253, 241.1, 395.2, 438, 439; 710/100, 110, 113, 241

(56) References Cited

U.S. PATENT DOCUMENTS

| | | | | |
|---|---|---|---|---|
| 5,867,670 A | * | 2/1999 | Kim et al. | 710/113 |
| 5,948,080 A | * | 9/1999 | Baker | 710/37 |
| 5,963,543 A | * | 10/1999 | Rostoker et al. | 370/232 |
| 6,377,998 B2 | * | 4/2002 | Noll et al. | 709/236 |
| 6,381,245 B1 | * | 4/2002 | Hann et al. | 370/395.6 |

* cited by examiner

Primary Examiner—Ricky Ngo
Assistant Examiner—Yvonne Q. Ha
(74) Attorney, Agent, or Firm—Fleshner & Kim, LLP

(57) ABSTRACT

A system and method for detecting an error in a transmission of data through an ATM cell in a ATM switching system is disclosed. The present invention allows a system manager to easily detect errors as the errors occur in the ATM switching system.

12 Claims, 3 Drawing Sheets

METHOD OF MONITORING ATM CELL BUS

FIELD OF THE INVENTION

The present invention relates to a data communication and more particularly to monitoring an Asynchronous Transfer Mode cell bus.

DISCUSSION OF THE RELATED ART

The Asynchronous Transfer Mode (ATM) is the technology selected by the Consultative Committee on International telephone & Telegraph (ITU) International standards organization (now called the ITU-T) to realize a Broadband Integrated Services Digital Network (B-ISDN). ATM is a very high speed transmission technology utilized in data communication. A general concept of ATM is disclosed by Harry Neviton in *Newton's Telecom Dictionary*, Flatiron Publishing, pp. 67–8, 1998 and is fully incorporated herein.

ATM is a high bandwidth, low-decay, connection-oriented, packet-like switching and multiplexing technique. The usable capacity is segmented into 53 fixed size cells, consisting of header and information fields, allocated to services on demand. The small, fixed length cells require lower processing overhead and allow higher transmission speeds than traditional packet switching methods. Also, ATM automatically adjusts the network capacity to meet the system needs and can handle data, voice, video and television signals.

All broadband transmissions (whether audio, data, imaging or video) are divided into the fixed length cells and routed across an ATM network consisting of links connected by ATM switches. Each ATM link comprises a constant stream of ATM cell slots into which transmissions are placed or left idle, if unused. The cell-switching technology of ATM combines the best advantages of both circuit-switching (for constant bit rate services such as voice and image) and packet-switching (for variable bit rate services such as data and full motion video) technologies.

Particularly, each cell consists of 53 eight-bit bytes, called octets, wherein five octets are header field and the remaining 48 octets are user data. The header contains data that identifies the related cell, a logical address that identifies the routing, header error correction bits for priority handling and network management functions. The user data contains the "payload" or the information to be transmitted.

An ATM switching system in the related art includes a bus master and a plurality of bus slaves connected to the bus master. Also, a system manager may monitor the status of ATM cell buses utilizing a Cyclic Redundancy Check (CRC). Namely, the cell buses are monitored during the transmission and reception of Packets by periodically requesting and receiving responses to analyze the CRC value of the transmitted and received data.

As an error detection method for detecting group error in the transmitted data, the CRC utilizes polynomial codes for error detection as well as the minimum bits required for expressing the data to detect errors. For CRC, additional bits need not be attached to each character, like a parity checking method. However, a Frame Check Sequence (FCS) calculated based upon the actual contents of a frame is attached to the end of the frame and transmitted. Accordingly, generation of polynomial to calculate the FCS is required.

As described above, CRC allows a system manager to periodically detect errors in the ATM switching system. Therefore, errors cannot be detected as the errors occur in between the periods while the ATM switching system is in operation.

SUMMARY OF THE INVENTION

An object of the present invention is to solve at least the problems and disadvantages of the related art.

Another object of the present invention is to provide a hardware based method of monitoring ATM cell buses.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein,

BRIEF DESCRIPTION OF THE DRAWINGS

The invention will be described in detail with reference to the following drawings in which like reference numerals refer to like elements wherein.

DETAILED DESCRIPTION OF THE INVENTION

Figure 1:
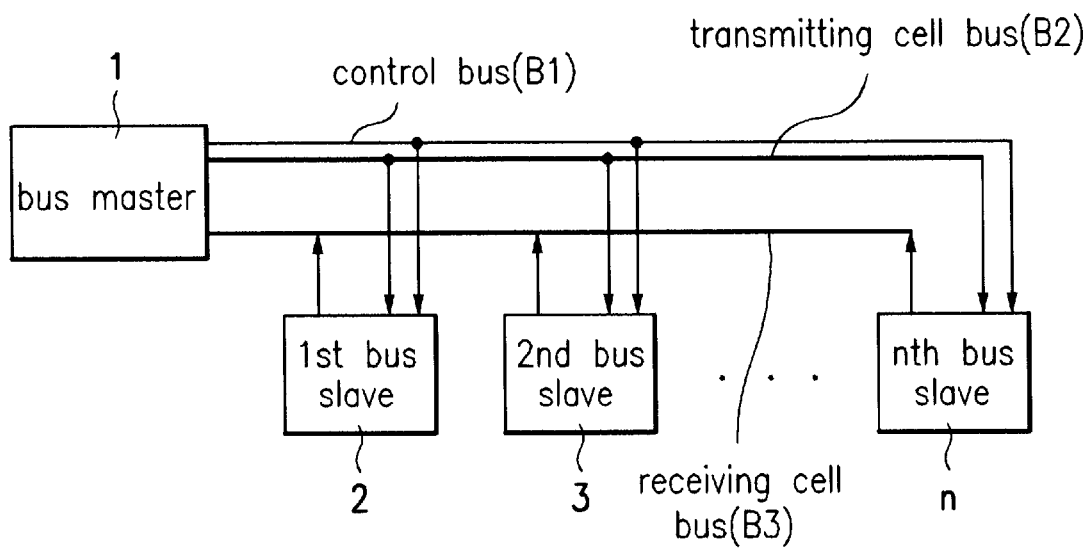
FIG. 1 is a general structure of an ATM switching system in the related art.

FIG. 1 is a general structure of ATM cell bus including a bus master 1 which controls an allocation of the ATM cell bus; a plurality of bus slaves 2~n which use the ATM cell bus allocated by the bus master 1; a control bus B1 which transmits a control signal from the bus master 1 to each bus slaves 2~n for controlling each bus slaves 2~n; a transmitting cell bus B2 which transmits data from the bus master 1 to each bus slaves 2~n; and a receiving cell bus B3 which transmits data from each bus slaves 2~n to the bus master 1.

In the ATM cell bus, the bus master 1 transmits the necessary data to a corresponding bus slave via a transmitting cell bus B2, and each bus slaves 2~n transmit the necessary data to the bus master 1 via a receiving cell bus B3. Also, the bus master 1 controls the bus slaves 2~n by transmitting a control signal via a control bus B1.

Figure 2:
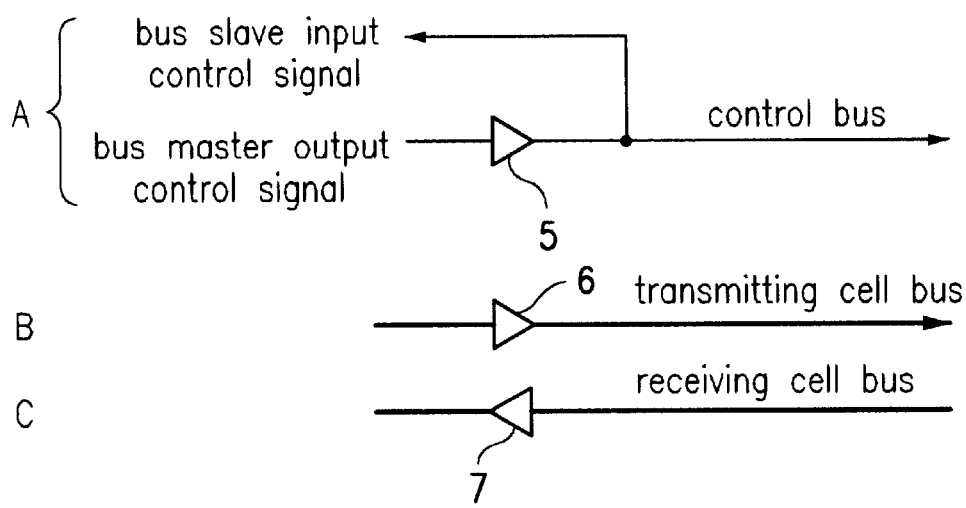
FIGS. 2A to C Illustrate the flow of control signals in ATM cell buses according to the present invention.

As shown in FIGS. 2A to C, the control bus B1, the transmitting cell bus B2 and the receiving cell bus B3 respectively include buffers 5~7 generated, in effect, due to the backbone of the ATM cell bus system. In the present invention, the signal prior to the buffer is a control signal output from the bus master 1 and the signal after the buffer is a control signal from the bus master 1 input to the bus slaves 2~n. Accordingly, the buffer 5 differentiates the bus master output control signal from the bus slave input control signal.

Figure 3:
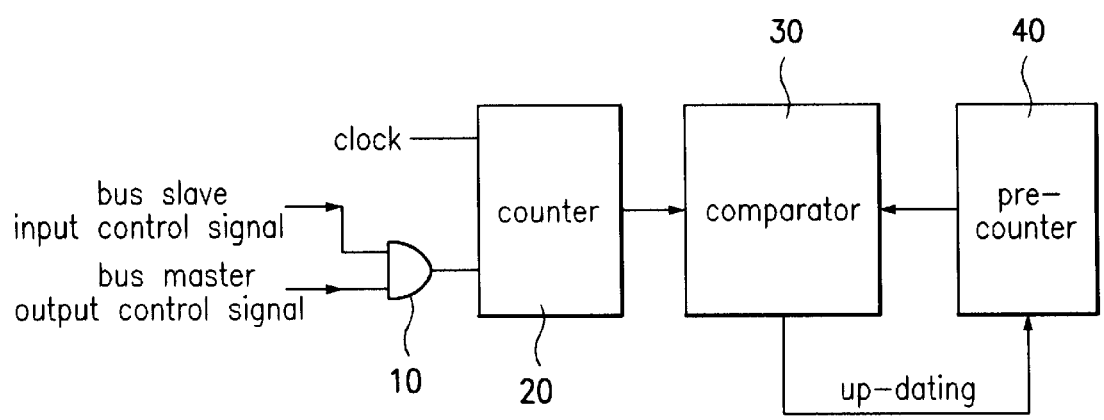
FIG. 3 is a block diagram of an ATM cell bus monitoring apparatus according to the present invention.

Because of the difference between the bus master output control signal and the bus slave input control signal, the transmission of data through an ATM cell bus must be monitored in order to determine whether the system is normally operating. Accordingly, a plurality of ATM cell bus monitoring apparatuses as shown in FIG. 3 is implemented in the present invention. Particularly, an ATM cell bus monitoring apparatus is implemented in each one of the bus slave 2~n.

Figure 4A:
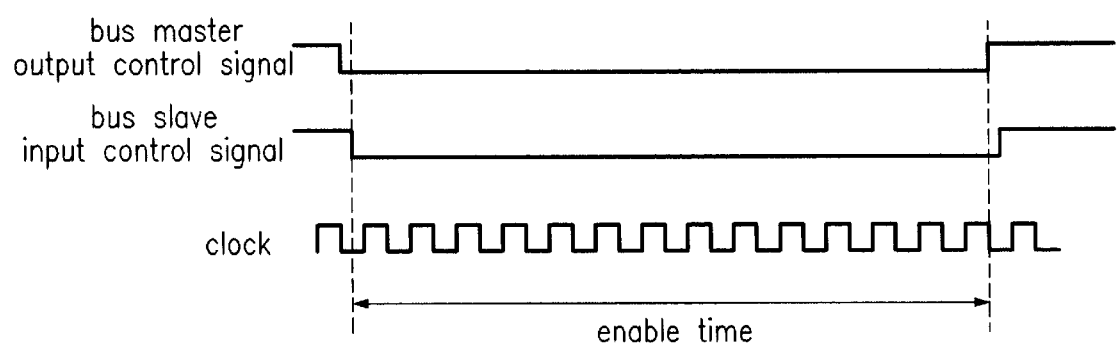
FIG. 4A is a timing diagram illustrating a normal operation of the ATM switching system.
Figure 4B:
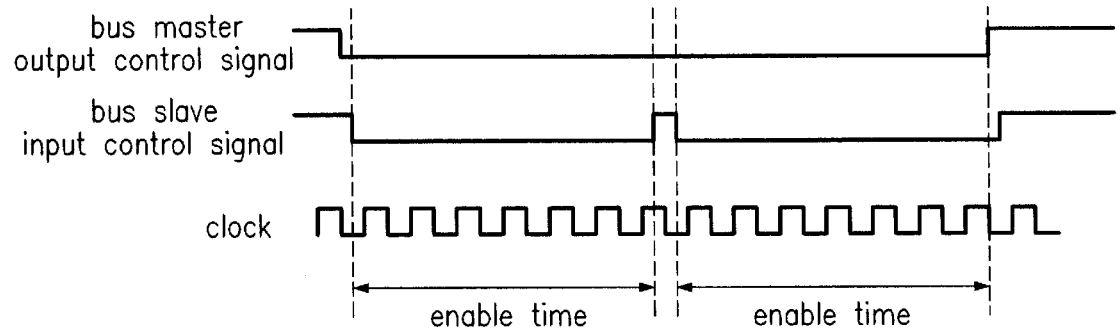
FIG. 4B is a timing diagram illustrating an abnormal operation of the ATM switching system.

Referring to FIG. 3, the ATM cell bus monitoring apparatus includes an AND Gate 10 which receives and performs a logical AND operation on the bus slave input control signal and the bus master output control signal; a counter 20 which receives and counts the signal output from the AND Gate 10 for a period enabled by the input clock signal; a comparator 30 which compares the count value from the counter 20 with a prestored count value; and a pre-counter 40 which updates, if necessary, and stores the lower count value from the counter 20. The period enabled by the input clock signal, i.e. the enabled time, represents the period in which the logic levels of the bus slave input control and the bus master output control signals are equivalent as shown in FIGS. 4A and 4B. The operation of the ATM cell bus monitoring apparatus will next be explained.

First, an AND logic operation is performed on the bus slave input control signal and the bus master output signal. The logically added signal is counted by the counter 20 for the enabled time. If noise or Jitter is generated due to circumstances of the internal or external environment while the counter 20 counts, the counter 20 resets and restarts counting the logically added signal.

The count value of the counter 20 is stored in a memory device (not shown) and input to the comparator 30 which compares the received count value to a prestored count value. Namely, the prestored count value is a count value of a period necessary for the ATM switching system to transmit or receive an ATM cell via the ATM cell bus and is stored in the pre-counter 40. Accordingly, the counter 20 compares the count value received from the counter 20 and the prestored count value from the pre-counter 40.

Upon comparison, the comparator 30 outputs the lower of the two count values to the pre-counter 40. Here, the comparator 30 would output either the count value from the counter or the prestored count value if the two values are equivalent. The pre-counter 40 receives the count value from the comparator 30 and updates the prestored count value if necessary, i.e. if the newly received count value is lower than the prestored count value. Thereafter, an error message may be transmitted and displayed on a monitor if the received count value is lower than the prestored count value.

Particularly, if the ATM switching system is operating normally, the enabled time for the counting would be constant and the count value would be constant. In contrast, if the ATM switching system is operating abnormally, the enabled time for the counting of the logically added signal would be inconsistent. Because of jitter or noise, the counting would be restarted, thereby shortening the enabled time. FIG. 4A shows an enabled time in a normal state and FIG. 4B shows a shortened enabled time in an abnormal state. As seen from a comparison of FIGS. 4A and 4B, the count value of an abnormally operating system would result in a lower count value than a count value of a normally operating system. Thus, an update of the prestored count value would indicate that data is not being normally transmitted in the ATM cell bus.

Accordingly, a transmission of the error message may be triggered by an update of the prestored count value or upon a request by the system manager. With such an error message, the system manager can also determine the location in which an error has risen within the ATM cell. Moreover, after a transmission of an error message, the prestored count value is reset to the initial count value, i.e. the count value of a period necessary for the ATM switching system to transmit or receive an ATM cell via the ATM cell bus. Alternatively, the prestored count value may be reset to the initial count value after each period equivalent to an enabled time period in an normal operation.

For example, if the period necessary for the ATM switching system to transmit or receive an ATM cell via the ATM cell bus is 64 clocks, the count value obtained during the enabled time would be 64 in a normal state. Also, the prestored count value would initially be 64. However, the count value would be less than 64 in an abnormal state due to a shortened enabled time, as shown in FIG. 4B.

Thus, when the comparator 30 compares the count value from the counter 20 with the prestored count value, 64 in the above example, the count value from the counter 20 would be smaller than 64. Accordingly, the pre-counter 40 would update and store the lower count value as the prestored count value. The update would trigger a transmission and display of an error message on a monitor and then prestored count value would be reset to 64.

As described above, according to the present invention, the system manager can easily recognize the status of an ATM cell bus in the ATM switching system. Therefore, the system manager may take appropriate remedial actions such that the system normally operates, thereby increasing the system reliability.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An ATM cell bus monitoring apparatus comprising:

an AND Gate which receives and performs a logical AND operation on a bus slave input control signal and a bus master output control signal;

a counter which receives and counts the logically added signal from the AND Gate for a period enabled by an input clock signal;

a comparator which compares a count value from the counter with a prestored count value and outputs a lower of the two count values; and a pre-counter which stores the prestored count value and updates the prestored count value with the count value from the counter if said count value from the counter is lower than the prestored count value.

2. An apparatus of claim 1, wherein the comparator outputs one of either a count value from the counter or the prestored count value, if the two count values are equivalent.

3. An apparatus of claim 1, wherein the pre-counter initially stores a prestored count value equivalent to a count value of a period necessary for an ATM switching system to transmit an ATM cell through a cell bus.

4. An apparatus of claim 1, wherein an update of the prestored count value triggers a transmission and display of an error message on a monitor.

5. An apparatus of claim 4, wherein the prestored count value is reset after the transmission of an error message.

6. An apparatus of claim 1, wherein the period enabled by an input clock signal is a period in which the logic levels of the bus slave input control and the bus master output control signals are equivalent.

7. A method of monitoring ATM cell bus comprising:

(a) receiving and performing a logical AND operation on a bus slave input control signal and a bus master output control signal to output a logically added signal;

(b) counting the logically added signal for a period enabled by an input clock signal to output a first count value;

(c) comparing the first count value a prestored count value and outputting a lower of the two count values as a second count value; and (d) updating the prestored count value with the second count value if said second count value is lower than the prestored count value.

8. A method of claim 7, wherein in (c), outputting one of either the first count value or the prestored count value, if the two count values are equivalent.

9. A method of claim 7, wherein the prestored count value is equivalent to a count value of a period necessary for an ATM switching system to transmit an ATM cell through a cell bus.

10. A method of claim 7, further comprising transmitting and displaying of an error message on a monitor when the prestored count value is updated in (d).

11. A method of claim 10, wherein resetting the prestored count value after the transmission of an error message.

12. A method of claim 7, wherein the period enabled by an input clock signal is a period in which the logic levels of the bus slave input control and the bus master output control signals are equivalent.

\* \* \* \* \*